United States Patent [19]

Miller et al.

[11] Patent Number: 5,083,884
[45] Date of Patent: Jan. 28, 1992

[54] METAL CERAMIC COMPOSITE BODY

[75] Inventors: Bradley J. Miller, Murrysville, Pa.; Kazimierz Sawicki, Worcester, Mass.

[73] Assignee: Norton Company, Worcester, Mass.

[21] Appl. No.: 642,488

[22] Filed: Jan. 17, 1991

Related U.S. Application Data

[63] Continuation-in-part of Ser. No. 517,018, May 1, 1990, abandoned.

[51] Int. Cl.⁵ ............................................. F16D 1/00
[52] U.S. Cl. .................................... 403/404; 403/30; 403/272; 123/90.61
[58] Field of Search ............... 403/30, 404, 28, 272; 123/90.61; 29/898.052, 898.053, 898.043

[56] References Cited

U.S. PATENT DOCUMENTS

| | | | |
|---|---|---|---|
| 2,897,805 | 8/1959 | Etzler | 123/90.61 |
| 2,975,775 | 3/1961 | Macura | 123/90.61 |
| 3,066,658 | 12/1962 | Gondek | 123/90.61 |
| 3,191,290 | 6/1965 | Knox | 123/90.61 X |
| 3,965,554 | 6/1976 | Amos | 29/898.053 |
| 4,614,453 | 9/1986 | Tsuno et al. | 403/30 |
| 4,806,040 | 2/1989 | Gill et al. | 403/404 X |

Primary Examiner—Andrew V. Kundrat
Attorney, Agent, or Firm—Volker R. Ulbrich

[57] ABSTRACT

A composite metal-ceramic article comprising a metal shaft and a ceramic ball bearing attached thereto. The shaft is tapered in such a manner to reduce the stress exerted on the ball.

11 Claims, 4 Drawing Sheets

METAL CERAMIC COMPOSITE BODY

CROSS REFERENCE TO RELATED APPLICATION

This application is a continuation-in-part of U.S. application Ser. No. 517,018, filed May 1, 1990, now abandoned.

TECHNICAL FIELD

The present invention is directed to a metal-ceramic composite article comprising a cylindrical metal shaft attached to a ceramic ball bearing. The metal shaft is tapered in such a manner as to lessen the stress on the ceramic ball which occurs due to the high temperatures required for attachment of the ceramic ball to the metal shaft.

BACKGROUND OF THE INVENTION

FIGS. 1A & B show a conventional prior art design for a metal-ceramic composite article comprising a metal shaft 10 joined by a conventional active metal braze composition to a ceramic ball 12. As shown, the metal shaft expands in diameter from the end which is joined to the ceramic ball 12 at an approximately 45° angle. The maximum stress on the ceramic ball is exerted at points 14 and is calculated to be about 400 ksi by the finite element method of analysis. As a result of this relatively high stress the ceramic ball is subject to a very high incidence of cracking during or after cooldown from the elevated bonding temperature. Shafts attached to ceramic balls of this construction are used in various industrial devices such as check valves for pumps, safety valves for pipe lines, locater pins, and ball joints. Accordingly, it is important that they be reliable and have a long life in use. Thus, a shaftball design which reduces the stress on the ball and increases the reliability of the shaft/ball structure is needed.

U.S. Pat. Nos. 4,659,245, 4,747,722 and 4,679,960 are each directed to metal/ceramic articles which are designed to be of improved strength. None of the devices, however, are directed to a metal shaft attached to a ceramic ball and thus do not deal with the problem described with reference to FIGS. 1A & B herein.

DISCLOSURE OF THE INVENTION

The present invention is directed to an improved joint structure wherein a cylindrical metal shaft is joined to a ceramic ball such as a bearing ball. The metal shaft's cross section at the end of the shaft which is joined to the ball is at least about 90% of the diameter of the ball and is then immediately tapered to a diameter which is less than or about equal to that diameter. The remainder of the shaft may have any diameter desired, though generally it will be larger to provide side load strength. The tapering (i) reduces the maximum stress which is exerted on the ball from about 400 ksi (Prior Art, FIGS. 1A and B) to about 60 to 250 ksi and (ii) increases the strength of the joint from about 500 pounds to about 700 to 2000 pounds, depending on the specific tapered configuration. As a result, the composite shaft-ball structure, in which at least about 40% of the ceramic ball is in a concave matching socket at the end of the metal shaft, is less subject to fracturing after bonding and is more reliable than prior art shaft-ceramic ball composite structures.

The composite bodies of the present invention are particularly useful as check valves for down hole pumps, although they may also be useful in devices such as safety valves, locater pins, ball/socket joints, and wear pins.

DETAILED DESCRIPTION OF THE PREFERRED EMBODIMENTS

Figure 2B:
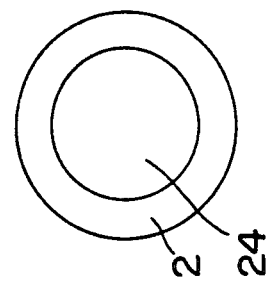
FIG. 2B is a top view of FIG. 2A taken along line II—II of FIG. 2A.
Figure 2A:
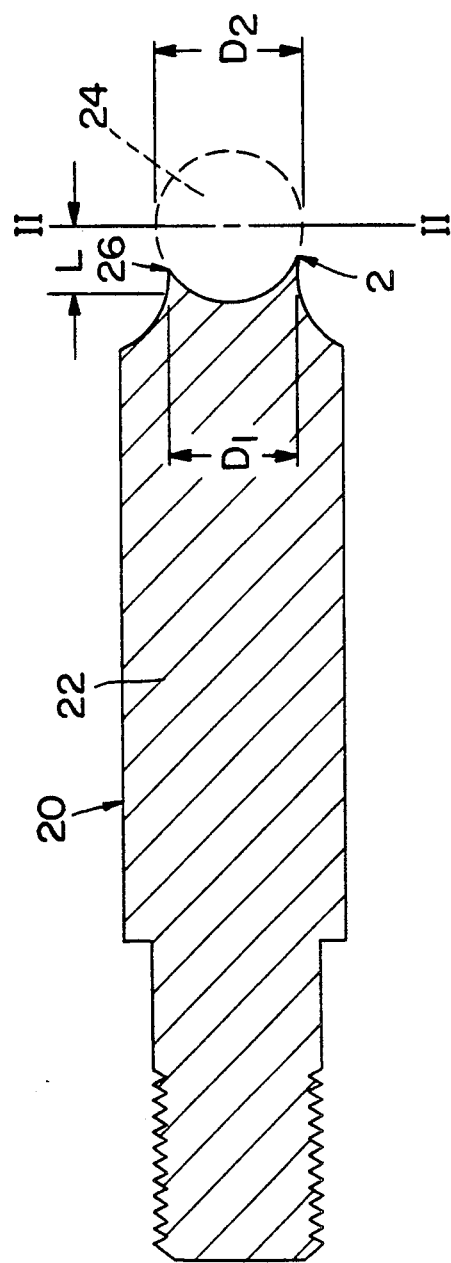
FIG. 2A is a sectional view of one embodiment of the present invention.

Referring to FIGS. 2A and B, one embodiment of the present invention is shown. (In this section, like reference numerals show the same members.) As shown, the composite shaftball body 20 comprises a cylindrical shaft 22 joined to a ceramic ball 24, preferably of bearing quality. The shaft 22 is made of metal and is generally of from about 0.25 to 1 inch in diameter and of from about 0.4 to 7 inches in length. The type of metal that is used will, of course, depend upon the specific end use of the composite body. Examples of suitable metals include carbon steels, stainless steels, cast iron, aluminum, Kovar, Invar, superalloys, titanium, nickel-based alloys, and copper-based alloys. Other suitable metals may also be employed. The composition of the ball 24, like the shaft 22, will also depend upon the intended end use for the composite body. Suitable ceramic materials include silicon carbide, silicon nitride, aluminum nitride, alumina, boron carbide, zirconia, sialon, steatite, mullite, cordierite, boron nitride, zirconia toughened aluminum, and mixtures thereof. The ball 24 is generally of a diameter of from about 0.125 to 1.125 inches.

The shaft-ball bodies of the present invention are readily prepared by narrowing or tapering the shaft material in any convenient manner. Thereafter, the ceramic ball is placed in intimate contact with a mated receiving portion at the end of the metal shaft to which it is to be bonded and the combination is joined by general diffusion bonding techniques. Generally temperatures on the order of 600° C. or higher will be used, but the specific temperature will depend upon the specific materials being joined. In the event that the ceramic and the metal have little or no tendency to adhere to each other, as is quite common, an intermediate cohesive layer, i.e. an interlayer (not shown), must be provided. Even if such an interlayer is not strictly necessary, it is often advantageous to use one.

The interlayer material must be one which is stable at elevated temperature, i.e. above about 150°-200° C. Examples of suitable interlayer materials include very thin, i.e. about 1 to about 5 mil, copper, nickel, aluminum, and similar metals which are different from the metal being joined to the ceramic; active metal braze compositions such as those which are based upon silver, gold, palladium, and the like; and sputter coatings of active metals such as titanium, nickel, and the like. These interlayer materials are all well known in the art of joining and further details thereon may be found in the literature. A particularly good, relatively low temperature, i.e. about 600° C., active metal braze composition is one comprising about 59% silver, 27% copper, 13% indium and 1% titanium. When an interlayer is used, it is placed between the surfaces to be joined and the composite structure is heated for an extended period until the joining has been completed.

The amount of shaft reduction which should be used for a particular system has been found to be related to the bonding temperature or braze solidus of the braze which is used; i.e. the higher the bonding temperature or braze solidus, the more reduction in shaft diameter that should be used. This is due to higher temperatures putting more stress on the ceramic ball due to the inherent thermal expansion mismatch with the metal shaft.

In order to lessen the stress at points 26, which are the points of maximum stress on the ball 24, the end of the shaft is tapered. As shown, the diameter $D_1$ of the shaft at the joint is at least about 90% of the diameter $D_2$ of the ball 24 to which it is joined. Preferably, it is within 10% of the diameter. Most preferably it is about 9 to 100% of the diameter. This ensures that at least about 40% of the ceramic ball is in the mated socket of the shaft. The end of the shaft which is joined to the ball is held at an essentially constant diameter or preferably is tapered from the attaching end until at least the depth of the socket, preferably in the form of an arc for ease of manufacture, in such a manner that the minimum diameter is held constant or preferably is reduced to less than about $D_2$. The minimum diameter of the shaft should be located at a distance of L from the center of the ball, which distance is equal to or greater than $\frac{1}{2} D_2$. The distance L is important because the minimum diameter of the shaft should occur before the start of the ball receiving socket so that there is no interference with the ball attachment, i.e. to insure adequate strength in the metal shaft. The minimum diameter should be reached at a maximum distance L of about 2 $D_2$ to retain adequate strength in the metal shaft. Preferably, the minimum diameter will occur at a distance L of about greater than $\frac{1}{2} D_2$ to $D_2$. A composite body of this construction exerts a maximum stress on the ceramic ball 24 of about 200 ksi. Example 1 describes such a composite body. The surface of the shaft which is joined to the ball 24 is concave so as to substantially match the convex outer surface of the ball 24.

Figure 3B:
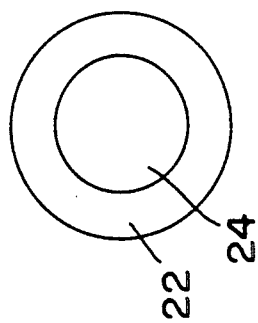
FIG. 3B is a top view of FIG. 3A taken along line III—III of FIG. 3A.
Figure 3A:
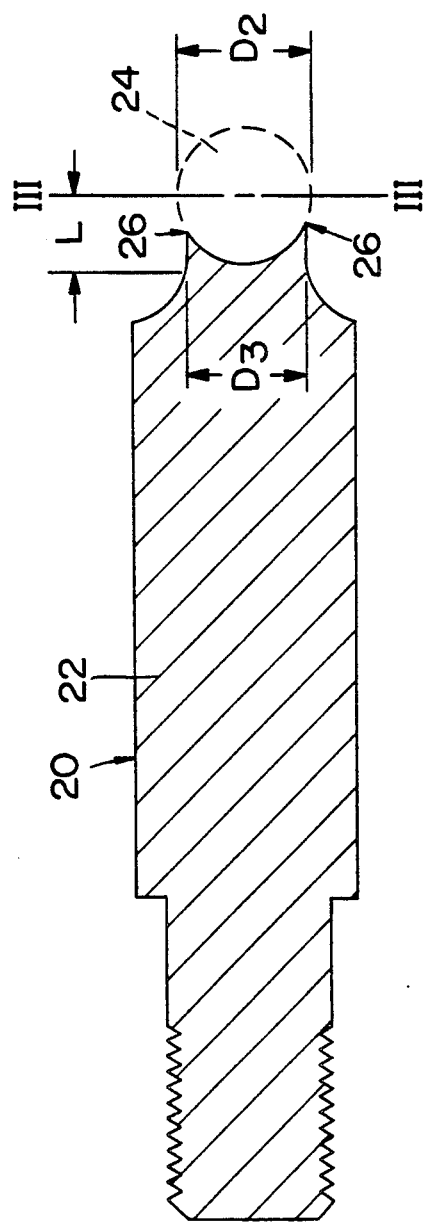
FIG. 3A is a sectional view of another embodiment of the present invention.

FIGS. 3A and B show another embodiment of the present invention wherein the tapering of the end of the shaft 22 that is joined to ball 24 is slightly more severe than that of the shaft 22 in FIGS. 2A and B. An arc is cut into the tapered shaft area of FIGS. 2A and B to reduce the diameter of the shaft to less than the diameter of the ball. In this embodiment, the minimum diameter $D_3$ is from about 0.99 $D_2$ to 0.85 $D_2$. The stress exerted on the ball 24 at points 26 is about 100 ksi. Example 2 describes a composite body similar to the one described in FIGS. 3A and B.

Figure 4B:
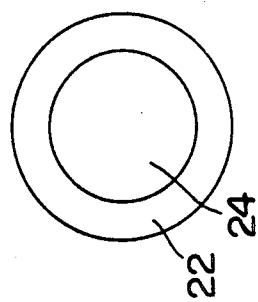
FIG. 4B is a top view of FIG. 4A taken along line IV—IV of FIG. 4A.
Figure 4A:
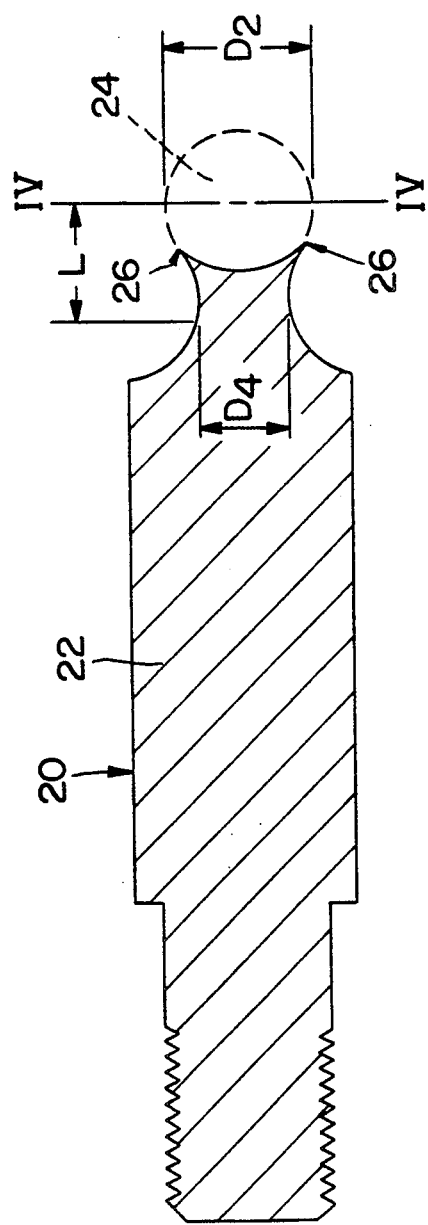
FIG. 4A is a sectional view of still another embodiment of the present invention.

Still another embodiment is shown in FIGS. 4A and B. In this embodiment, the tapering of the end of the shaft 22 which is joined to the ball 24 is even more severe than the taper in FIGS. 3A and B. As shown, the tapering results in an hour-glass shape with a minimum diameter $D_4$ of about 0.45 $D_2$. A composite body similar to the embodiment of FIGS. 4A and B is described in Example 3. As described therein, the maximum stress exerted on ball 24 is reduced to about 70 ksi at points 26.

Maintaining or reducing the diameter of the shaft from the outer point of attachment of the ball to a point at or below the bottom of the ball socket lessens the stress in the ball by increasing the compliance of the metal shaft in the region of the terminus. This compliance then decreases in the direction of the joint which results in the stress being applied gradually to the ball. In addition, the curved surface of the ball serves to increase the stiffness of both parts so that a large compression can be gradually exerted on the ball. By causing the shaft to expand into the ball so as to form as close to a continuous surface through the ball, a solid load path can be generated from the shaft to the ball.

While FIGS. 3A and 4A show an arcuate taper, this is merely for the ease of manufacture and may affect the strength of the shaft when subject to side loading. Alternatively, a linear taper (not shown) may be utilized without removal of the fillet as will occur with an arcuate taper. The linear taper will leave a little more metal in the shaft for strength, but an arc is a smoother machining process.

When an arcuate taper is used, it will generally be produced by a two-step process. First, a straight taper is formed at a constant diameter of about the diameter of the ball, or slightly more if sharp edges are to be avoided, at the end of the shaft to be joined to the ball. Then an arcuate surface is cut into the tapered area. The arcuate surface may conveniently be up to about the same general radius used to form the ball socket but will extend for only a minor portion of the depth thereof.

Accordingly, the minimum diameter of the tapered metal shaft may range from about 0.45 $D_2$ to $D_2$ + about 0.1 inch. The minimum diameter is always at a distance L greater than or equal to $\frac{1}{2} D_2$ measured from the center of the ball to the point of minimum diameter of the shaft. Preferably the maximum distance L will be no more than about 2 $D_2$. As the minimum diameter is reduced to its minimum value the stress exerted on the ball is also reduced. The minimum diameter should not be less than about 0.45 $D_2$ because the strength of the shaft will be greatly compromised below this level and premature failure of the system through the metal is likely to occur.

Examples of composite shaft/ball bearing bodies manufactured according to the present invention will now be described.

COMPARATIVE EXAMPLE A

Figure 1B:
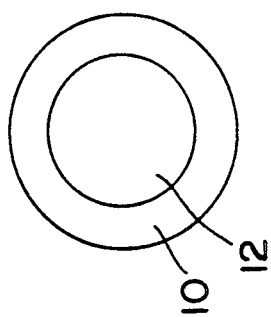
FIG. 1B is a top view of FIG. 1A taken along line I—I of FIG. 1A.
Figure 1A:
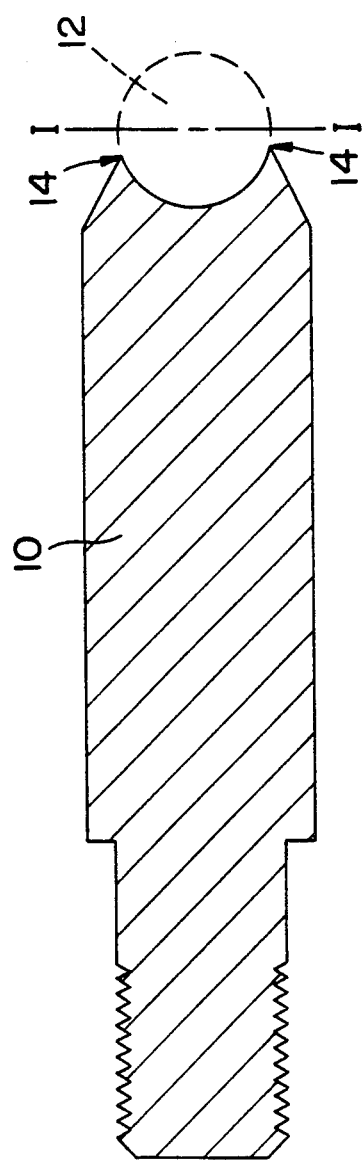
FIG. 1A is a sectional view of a prior art shaft-ball composite body.

The prior art shaft-ball composite structure of FIGS. 1A and 1B was prepared starting with a 446 stainless steel shaft 1½" long and ¾" in diameter. The socket to receive the ball was machined into the center of the end thereof and then the end of the shaft to be joined to a silicon nitride ball ½" in diameter was machined to a 60° included angle for a distance of about 3/16". To adhere the silicon nitride ball to the shaft a paste braze containing about 59% silver, 40% copper, and 1% titanium (Lucanex 721 from Lucas Milhaupt) was placed between cleaned surfaces to be joined which were held in place in a conventional manner. The structure was placed in a cold wall metallic element vacuum furnace which pulled an initial vacuum of greater than $10^{-5}$ Torr and heated according to the furnace cycle suggested by the braze manufacturer, i.e. to a maximum temperature of about 900° C., and then cooled to room temperature.

After cooldown, the strength of the joint was measured by shearing the ball off the shaft. The nominal shear strength of this prior art system was 500 pounds and failure was through the ceramic ball.

EXAMPLE I

The procedure of Comparative Example A was repeated except that the ball-receiving end of the stainless steel shaft was machined to be a straight shank with a diameter equal to that of the ball, as shown in FIGS. 2A and 2B.

The nominal shear strength of this joint was 700 pounds and failure was through the ball.

EXAMPLE II

The procedure of Comparative Example A was repeated except that the stainless steel shaft was machined to produce a 7/16" minimum diameter by cutting a ¼" arc radius in the shank of Example II. The minimum diameter was at a distance of ⅜" from where the center of the ceramic ball would be.

The nominal shear strength of this joint was 1800 pounds and failure initiated in the metal shaft.

EXAMPLE III

The procedure of Example II was repeated except that the shank was machined to produce a minimum diameter of ⅜".

The nominal shear strength of this joint was 1000 pounds and failure initiated in the metal shaft.

EXAMPLE IV

The procedure of Example III was repeated except that the stainless steel shaft was machined to a minimum diameter of ⅜" and then had a 30° linear taper out to ½" diameter, i.e. there was a fillet which was not removed.

The nominal shear strength of this joint was 1200 pounds with failure initiated in the metal shaft.

What is claimed is:

1. A metal-ceramic composite body comprising a cylindrical metal shaft attached to a ceramic ball, said shaft having a first end including a concave surface substantially matching the convex outer surface of the ball, the first end of the shaft being tapered from a shaft cross-section having a diameter of at least about 90% of the diameter of the ball to a shaft cross section having an equal or lesser diameter, said equal or lesser diameter being of from about 0.45. to 1 times the diameter of the first end, said equal or lesser diameter being at a minimum at a distance of at least about 0.5 of the diameter of the ball, as measured from the center of the ball.

2. The composite body of claim 1, wherein the taper is linear.

3. The composite body of claim 1, wherein the taper is in the shape of an arc.

4. The composite body of claim 3, wherein the arc has a radius of from about one half the diameter of the ball to about the diameter of the ball.

5. The composite body of claim 1, wherein the ball is a bearing ball.

6. The composite body of claim 1, wherein the shaft is tapered in the shape of an hour glass.

7. The composite body of claim 1, wherein the shaft is manufactured of a metal selected from the group consisting of stainless steel, nickel-based alloys, and cast iron and the ball is manufactured of a ceramic selected from the group consisting of silicon nitride, silicon carbide, zirconia, alumina, and zirconia toughened alumina.

8. The composite body of claim 1, wherein the minimum diameter of the tapered portion of the shaft is about 0.45 times the diameter of the ball.

9. The composite body of claim 1, wherein the minimum diameter of the tapered portion of the shaft is at a distance of less than about twice the diameter of the ball, as measured from the center of the ball.

10. The composite body of claim 1, wherein the diameter of the first end is about 90 to 110% of the diameter of the ball.

11. The composite body of claim 1, wherein the diameter of the first end is about 90 to 100% of the diameter of the ball.

* * * * *